United States Patent
Sadhu et al.

(10) Patent No.: US 11,177,843 B2
(45) Date of Patent: Nov. 16, 2021

(54) EFFICIENCY ANTENNA IMPEDANCE MATCHING

(71) Applicant: INTERNATIONAL BUSINESS MACHINES CORPORATION, Armonk, NY (US)

(72) Inventors: Bodhisatwa Sadhu, Peekskill, NY (US); Duixian Liu, Scarsdale, NY (US); Arun Paidimarri, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/362,639

(22) Filed: Mar. 23, 2019

(65) Prior Publication Data

US 2020/0304157 A1 Sep. 24, 2020

(51) Int. Cl.
*H04B 1/04* (2006.01)
*H04B 1/44* (2006.01)
*H01Q 9/16* (2006.01)
*H01Q 7/00* (2006.01)

(52) U.S. Cl.
CPC .............. *H04B 1/04* (2013.01); *H01Q 7/00* (2013.01); *H01Q 9/16* (2013.01); *H04B 1/44* (2013.01)

(58) Field of Classification Search
CPC ........ H04B 1/18; H04B 1/0458; H04B 1/006; H04B 1/40; H04B 1/525; H04B 1/10; H04B 1/1036; H04B 1/0057; H04B 1/48; H04B 1/0475; H04B 1/50; H04B 5/0031; H04B 1/44; H04B 17/21; H04B 1/04; H04B 1/401; H04B 2001/0408; H04B 2001/1072

USPC .......................................................... 455/78
See application file for complete search history.

(56) References Cited

U.S. PATENT DOCUMENTS

| | | |
|---|---|---|
| 6,298,243 B1 | 10/2001 | Basile |
| 6,377,227 B1 | 4/2002 | Zhu et al. |
| 6,819,287 B2 | 11/2004 | Sullivan et al. |
| 6,914,570 B2 | 7/2005 | Asrani et al. |
| 7,843,347 B2 | 11/2010 | Nikitin et al. |
| 8,970,378 B2 | 3/2015 | Deavours et al. |
| 2005/0107042 A1* | 5/2005 | Graauw ............... H04B 1/40 455/78 |
| 2008/0232446 A1* | 9/2008 | Baker ................. H03L 7/085 375/219 |
| 2012/0086616 A1 | 4/2012 | Park et al. |
| 2013/0281167 A1* | 10/2013 | Cho ................. H04B 17/12 455/571 |
| 2014/0113551 A1* | 4/2014 | Krishnan ......... H04B 5/0031 455/41.1 |

(Continued)

OTHER PUBLICATIONS

Alexander, W.C., "Matching Networks and Phasing" Crawford Broadcasting Company (XXXX), Denver, CO; 10 pgs.

(Continued)

*Primary Examiner* — Ajibola A Akinyemi
(74) *Attorney, Agent, or Firm* — Intelletek Law Group, PLLC; Gabriel Daniel, Esq.

(57) ABSTRACT

A device includes a transmitter. A main antenna is coupled to the transmitter. A matching network coupled to the transmitter and configured to match an impedance of the main antenna, wherein one or more components of the matching network provide a desired radiation.

20 Claims, 11 Drawing Sheets

(56) References Cited

U.S. PATENT DOCUMENTS

2017/0279186 A1* 9/2017 Xia ................. H01Q 1/245

OTHER PUBLICATIONS

Dhaouadi, M. et al., "A Broadband UHF Tag Antenna for Near-Field and Far-Field RFID Communications"; Radio Engineering (2014); vol. 23:4; pp. 1026-1032.
Li, X et al, "Dual-Printed-Dipoles Reader Antenna for UHF Near-Field RFID Applications"; IEEE Antennas and Wireless Propagation Letters(2011); vol. 10; pp. 239-242.
Marrocco, G., The Art of UHF RFID Antenna Design: Impedance-Matching and Size-Reduction Techniques; IEEE Antennas and Propagation Magazine (2008); vol. 50:1; pp. 66-79.

\* cited by examiner

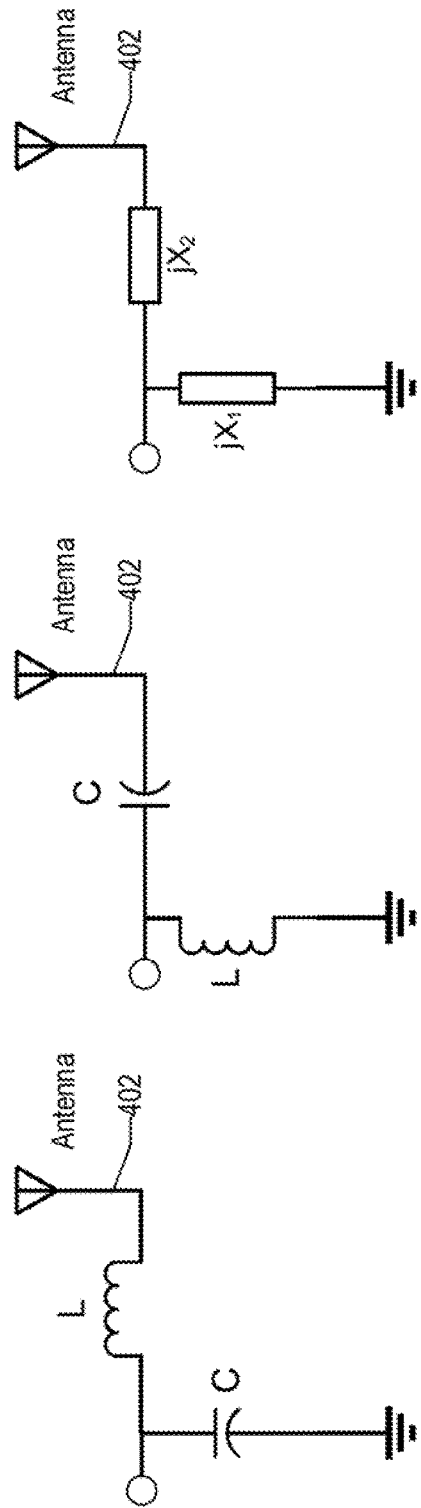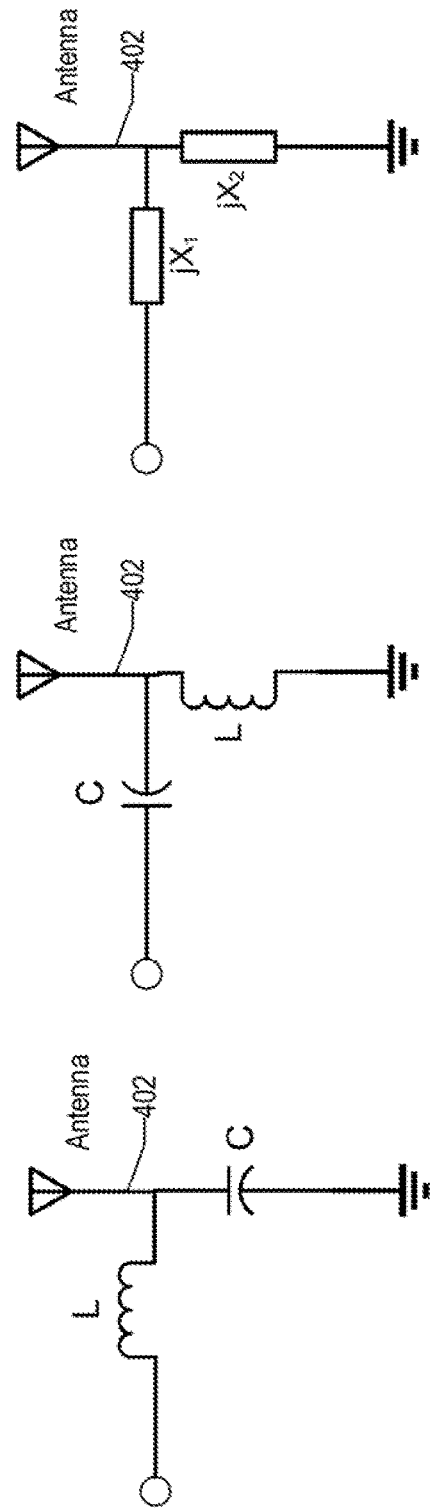
FIG. 4C
FIG. 4F
FIG. 4B
FIG. 4E
FIG. 4A
FIG. 4D

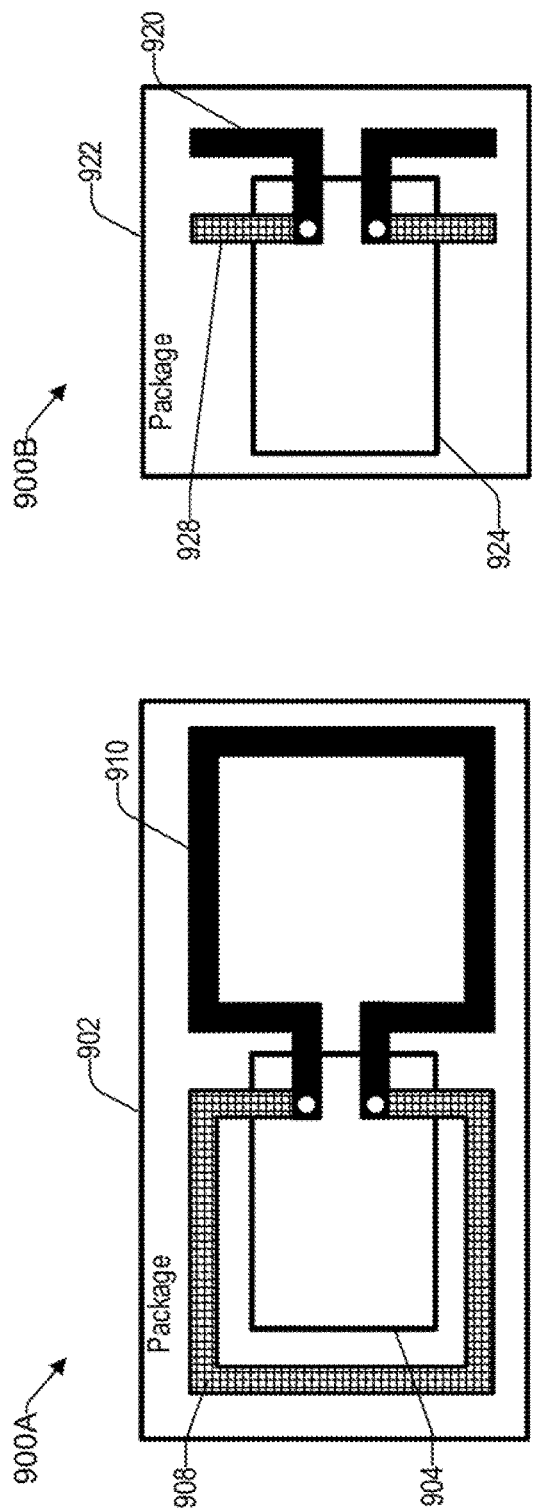
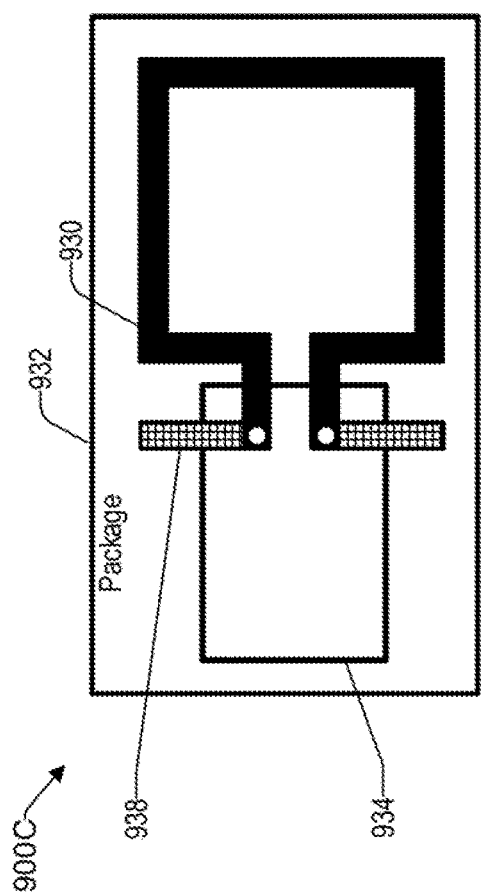
FIG. 9A
FIG. 9B
FIG. 9C

EFFICIENCY ANTENNA IMPEDANCE MATCHING

BACKGROUND

Technical Field

The present disclosure generally relates to wireless communication devices, and more particularly, to improving transmission and reception efficiency in antenna systems used in wireless communication.

Description of the Related Art

The impedance presented by an antenna can be different from the optimal interface impedance of a radio transmitter or receiver. A matching network is typically used to match the impedance of the transceiver to the impedance of the antenna for better power transfer. There is an inherent power loss in these matching networks, thereby reducing transmission efficiency.

SUMMARY

According to an embodiment of the present disclosure, a device is provided to transmit signals. The device includes a transmitter. There is a main antenna coupled to the transmitter. There is a matching network coupled to the transmitter. The matching network is configured to match an impedance of the main antenna. One or more components of the matching network provide a desired radiation by the matching network.

In one embodiment, the device includes a receiver, wherein the transmitter and the receiver together provide a transceiver.

In one embodiment, the matching network is positioned physically closer to the transmitter than the main antenna.

In one embodiment, a larger fraction of a power of the transmitter is applied to the matching network than the main antenna. The matching network may be configured to radiate more than the main antenna.

In one embodiment, the matching network includes a loop antenna. The main antenna is a dipole antenna or a loop antenna.

In one embodiment, the matching network includes a dipole antenna. The main antenna may be a loop antenna or a dipole antenna.

In one embodiment, the transmitter, the matching network, and the dipole antenna are coupled in series. Alternatively, the matching network and the dipole antenna are coupled in parallel at an output of the transmitter.

In one embodiment, the desired radiation of the matching network is different from a radiation of the main antenna by at least one of: (i) a direction, (ii) a frequency, or (iii) a polarization of the radiation.

According to one embodiment of the present disclosure, a device is provided to receive signals. The device includes a receiver. There is a main antenna coupled to the receiver. There is a matching network coupled to the receiver. The matching network is configured to match an impedance of the main antenna. One or more components of the matching network provide a desired radiation by the matching network.

According to one embodiment, a method of transmitting signals is provided. The method includes providing a transceiver, coupling a main antenna to the transceiver, and matching an impedance of the main antenna by a matching network coupled to the transceiver. The matching network also radiates a desired radiation by the matching network.

In one embodiment, a larger fraction of a power of the transceiver is applied to the matching network than to the main antenna.

In one embodiment, the transmitter, the matching network, and the dipole antenna are coupled in series. Alternatively, the matching network and the dipole antenna are coupled in parallel at an output of the transceiver.

In one embodiment, the desired radiation of the matching network is different from a radiation of the main antenna by at least one of: (i) a direction, (ii) a frequency, or (iii) a polarization of the radiation.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 4A to 4F are example "L" matching networks that are coupled to an antenna representing a load.

FIGS. 9A to 9C illustrate different configurations between the radiating elements of the radiating matching network and the main antenna, consistent with example embodiments.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of providing an antenna system with an improved transmission efficiency. To that end, the matching network is configured with radiating elements that contribute to the overall radiation of the antenna system. By virtue of the concepts discussed herein the overall radiation efficiency of the antenna system is improved.

Properly matching an antenna to a transceiver chip can not only extend the signal range but also improve the battery life of a wireless product. There are various factors that reduce the signal power transferred between a source, represented by a transceiver chip in the present disclosure, and load, represented by an antenna, including signal reflections and power dissipation losses. Impedance mismatches between an antenna and transceiver cause signal reflections, which are either absorbed back by the source or dissipated by lossy transmission lines and components. These reflections result in significantly reduced signal range, dropped data packets, and reduced battery life. In some scenarios where the reflected power is sufficiently high, such reflections can even damage the transceiver chip.

Maximum power transfer between a source (e.g., transceiver) and a load (e.g., antenna) occurs when their resistances are the same, or for AC circuits, when their impedances are complex conjugates of one another. For example, some transceivers and antennas may be designed with impedances of 50 ohms (resistive) at their inputs (or outputs). In such scenarios, antennas can be coupled to 50-ohm transmission lines to achieve a near maximum power transfer. It will be understood that in other scenarios, the input impedance of the antenna is not 50 ohms, or may include an imaginary component of the impedance (i.e., reactance). In such scenarios, a matching network can be used to match the antenna, including its feed line, to the impedance of the source.

Figure 1:
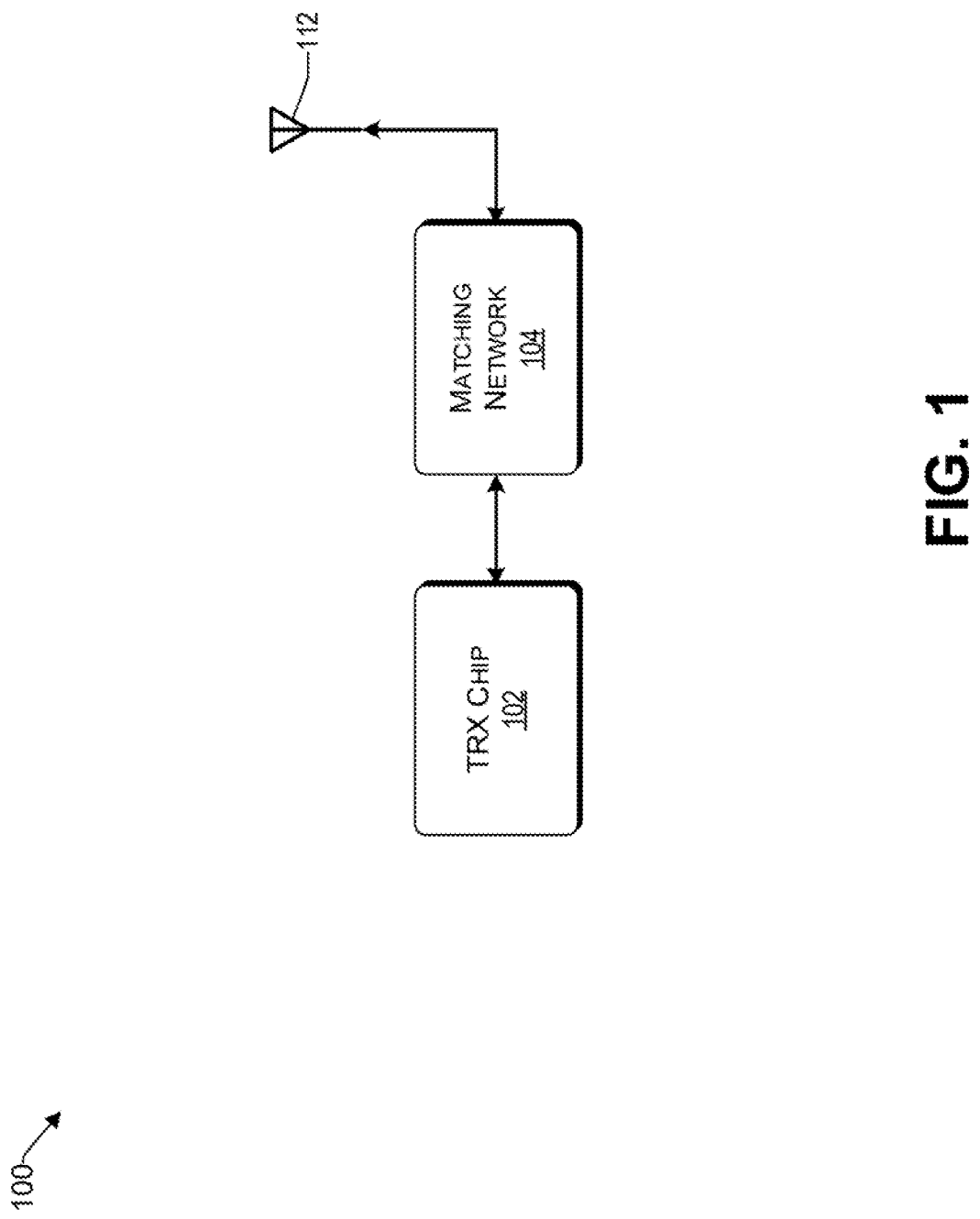
FIG. 1 illustrates a known antenna system.

FIG. 1 illustrates a known antenna system 100 that includes a transceiver chip 102 coupled in series to a matching network 104, which is coupled in series to an antenna 112. The matching network 104 is typically configured such that it transfers as much power from the source (i.e., transceiver chip 102) to the load (i.e., antenna 112) while presenting an input impedance that is equal to the complex conjugate of the source's output impedance. To avoid large power loss, matching networks may use only reactive components (e.g., components that store energy rather than dissipate energy) to transfer more power from the transceiver chip 102 to the antenna 112. Thus, matching networks typically use capacitors and inductors instead of resistors (i.e., components that store energy rather than dissipate energy).

Nonetheless, every matching network 104 dissipates power and therefore incurs loss. Thus, part of the power provided by the transceiver chip 102 is dissipated by the matching network 104, resulting in poor radiation efficiency of the system 100. This problem may be further exacerbated by miniaturization, where the size of the transceiver chip and/or the antenna is less than approximately 1 mm×1 mm.

Example Antenna System

Figure 2:
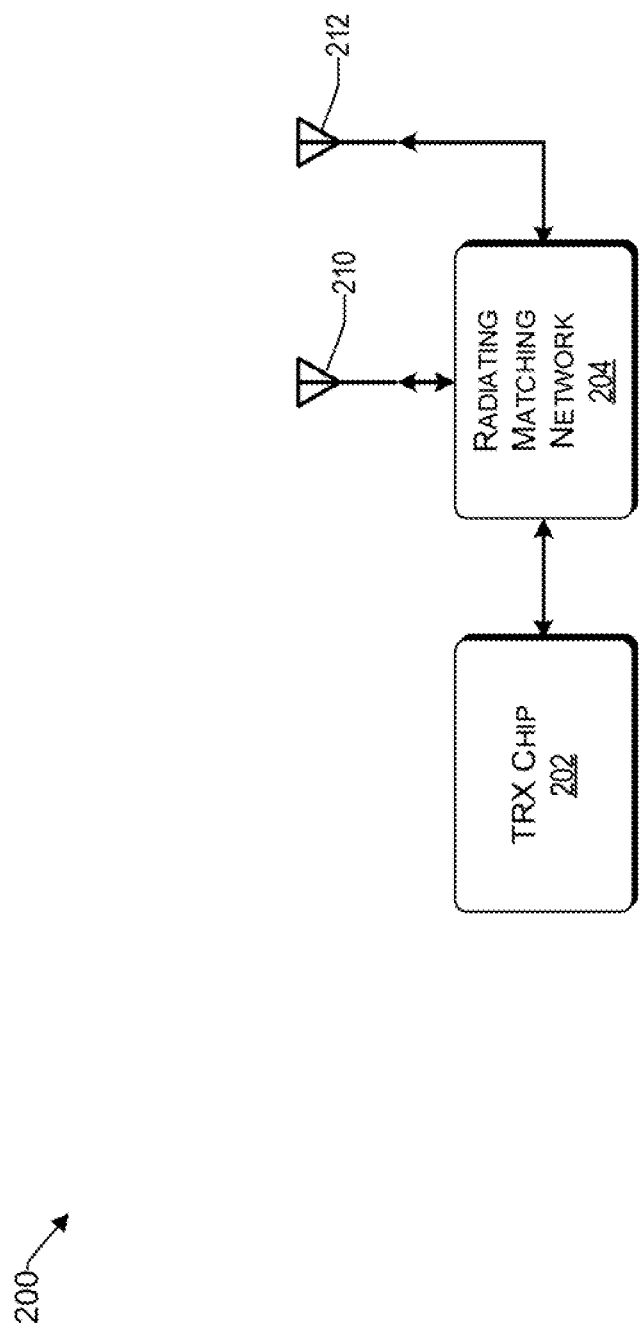
FIG. 2 is a block diagram of an antenna system, consistent with an illustrative embodiment.

FIG. 2 is a block diagram of an antenna system 200, consistent with an illustrative embodiment. The antenna system includes a power source, represented by a transceiver chip 202, an antenna 212 (sometimes referred to herein as the "main antenna") coupled to the transceiver chip 202, and a radiating matching network 204 coupled between the transceiver chip 202 and the antenna 212. The transceiver 202 is a circuit that includes components operative to transmit signals via the antenna 212 and the transmitting components of the radiating matching network 204. The transceiver 202 also has components operative to receive signals from the radiating matching network 204 and the antenna 212. While a transceiver 202 is used by way of example, in various embodiments, an independent receiver or an independent transmitter could be used instead. Indeed, due to antenna reciprocity, the same antenna matching network can also be used in the context of a receiver alone. The transceiver is discussed in more detail in the context of FIG. 3A.

The radiating matching network 204 is operative to not only match the impedance of the antenna 212, but also to provide a controlled and desired radiation. The radiating matching network 204 is configured to provide an input impedance to the transceiver chip 202 such that an efficient total radiation is achieved between the radiating matching network 204 (via its radiating component(s) 210) and the antenna 212, and/or to minimize signal reflection from the antenna. In various embodiments, the radiating matching network provides at least one of: (i) reflection-less matching, (ii) maximum power transfer matching, or (iii) resonance matching with the antenna, while itself providing a controlled radiation of at least one of (i) direction, (ii) frequency, (iii) and polarization.

For example, in reflection-less matching, the impedance of the antenna 212 is matched to minimize reflections by making the load impedance conjugately matched to the source impedance. Stated differently, the radiating matching network 204 transforms the antenna impedance into a desired load impedance for the circuit matches that of the antenna 212. At least some of the components used to implement the radiating matching network 204 are radiating component(s) 210 to provide a desired radiation. If the source impedance (e.g., transceiver chip 202), antenna 212 impedance, and radiating matching network are purely resistive, then reflection-less matching is the same as maximum power transfer matching.

In maximum power transfer matching, complex conjugate matching is used. For example, if the source has a reactive component, but the antenna 212 is substantially resistive, then adding a reactance of the same magnitude but of opposite polarity to the load achieves matching by the radiating matching network 204. As to resonance matching, it is achieved by the radiating matching network 204 by matching the imaginary part but not the real part of the antenna 212 load.

In one aspect, regardless of the type of matching performed by the radiating matching network 204, at least part of the energy used by the radiating matching network 204 is used to provide desirable radiation. For example, as mentioned above, the radiation provided by the radiating matching network 204 via its radiating element(s) 210 may be of a specific direction, of a particular frequency, and/or polarization. In one embodiment, the radiating matching network provides radiation that is of a different coverage than that of the main antenna 212. Stated differently, the main antenna 212 may be of a different direction, frequency, and/or polarization than the radiation provided by the radiating matching network 204. By virtue of using the radiation 210 of the radiating matching network 204 together with that of the main antenna 212, the net amount of radiation of the system 200 is substantially more than that of conventional systems 100, as will be discussed more in the context of FIGS. 6A and 6B.

Example Transceivers

Figure 3A:
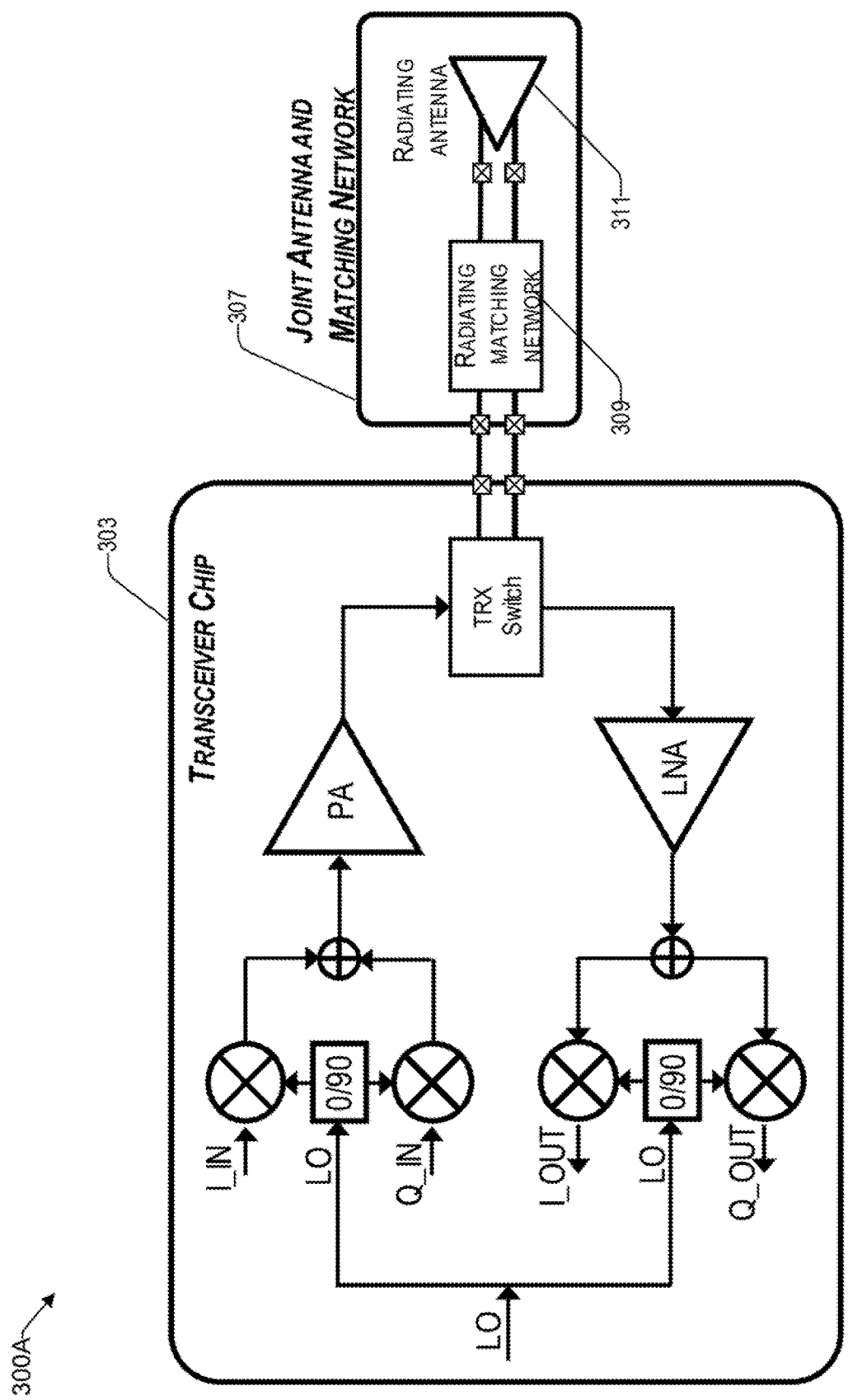
FIG. 3A is an example block diagram of a transceiver coupled to a joint antenna and matching network comprising a radiating matching network and a radiating antenna, consistent with an illustrative embodiment.

FIG. 3A is an example block diagram 300A of a transceiver 303 coupled to a joint antenna and matching network 307 comprising a radiating matching network 309 and a radiating antenna 311, consistent with an illustrative embodiment. It is believed that one skilled in the art are reasonably familiar with the operation of a transceiver and its operation is therefore not discussed in detail for brevity. The transceiver 303 can be used to implement the transceiver 202 of FIG. 2.

Figure 3B:
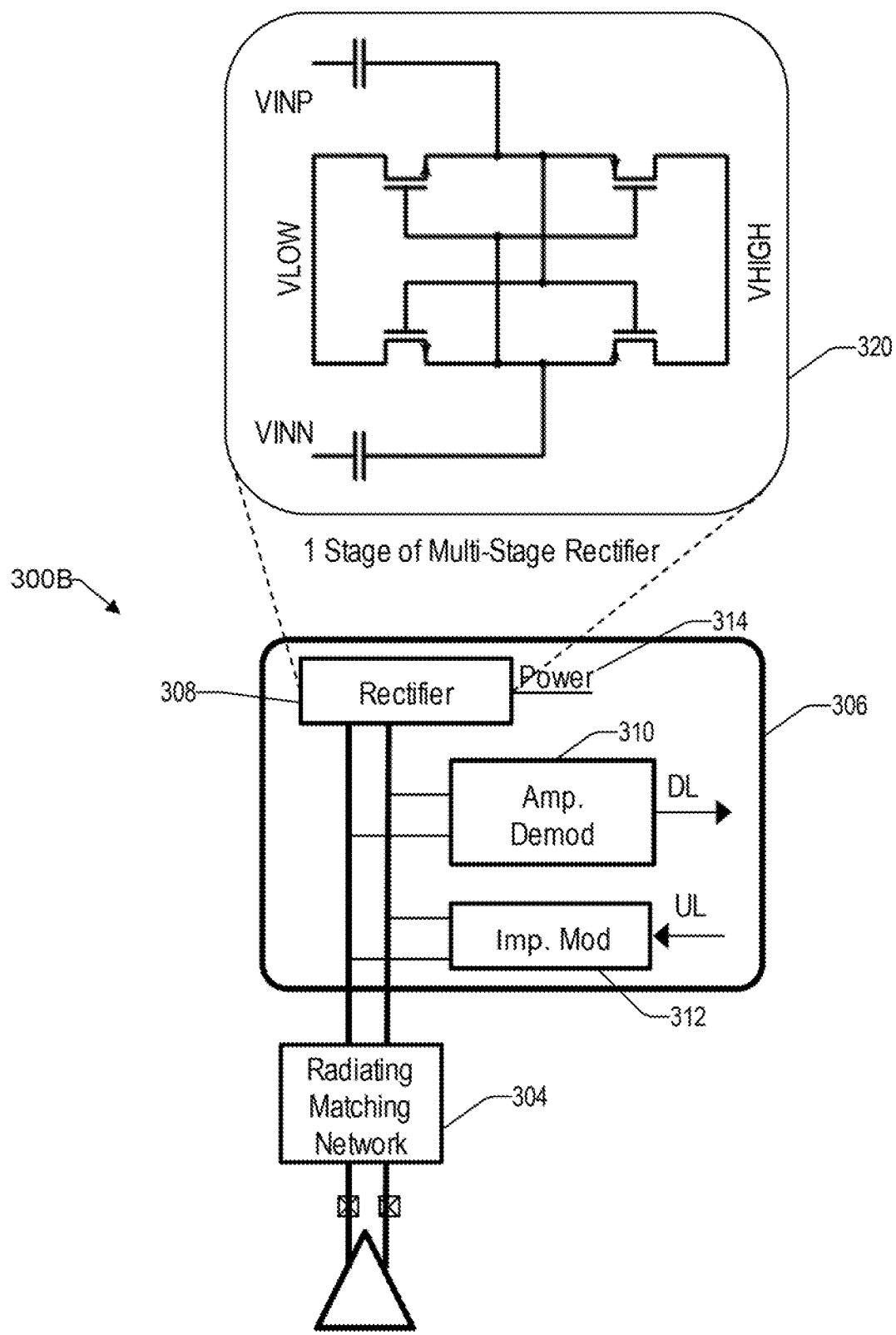
FIG. 3B is another example block diagram of a transceiver that can be used to implement the transceiver chip of FIG. 2, consistent with an illustrative embodiment.

Reference now is made to FIG. 3B, which is an example block diagram 300B of a transceiver coupled to a radiating matching network 304 that can be used to implement the transceiver chip 202 of FIG. 2, consistent with an illustrative embodiment. Transceiver 306 includes a rectifier 308 coupled to the radiating matching network 304. The rectifier is also coupled to a power source 314. The rectifier harvests power from the antenna and provides the power to the rest of the system. In a sense, the rectifier is a "receiver" and the radiating matching network enhances the power received by the chip, thereby enhancing the power harvesting range. There is an amplitude demodulation block 310 and an impedance modulation block 312 coupled in parallel between the rectifier 308 and the radiating matching network 304. The impedance modulation block 312 changes the impedance presented to the antenna. This leads to RF reflected back into the antenna. In this case, it acts like a "transmitter" and the radiative matching network enhances the total power radiated by the antenna, thus enhancing the communication range. Block 320 provides a more detailed view of a single stage of a multi-stage rectifier.

Example Radiating Matching Networks

Figure 5C:
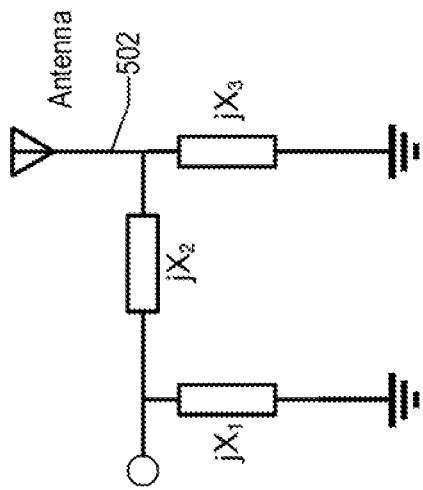
FIGS. 5A to 5C are example "π" matching networks that are coupled to an antenna representing a load.
Figure 5B:
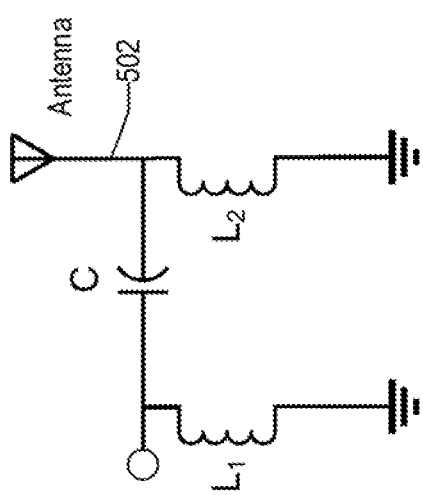
Figure 5A:
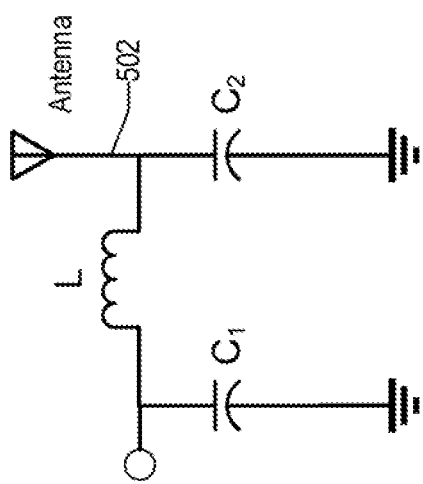

FIGS. 4A to 4F are example "L" matching networks that are coupled to an antenna 402 representing a load (i.e., RL). FIGS. 5A to 5C are example "π" matching networks that are coupled to an antenna 502 representing a load (i.e., RL). In each of the FIGS. 4A to 4F and 5A to 5C, the capacitor (C) and/or the inductor (L) can be replaced by radiating components discussed herein. In some embodiments, some inductor (L) or capacitor (C) components are replaced by radiating elements, while other inductor or capacitor components are not. In some embodiments, part of the capacitance and/or inductance is used as a radiating element, while the remaining portion of the capacitance or inductance is not radiating. In this way, a desired radiation is achieved by the radiating matching network. Any of the matching networks 4A to 4F and 5A and 5C can be used to implement the radiating matching network 204 of FIG. 2 and/or 304 of FIG. 3, consistent with illustrative embodiments.

Example Calculations

Figures 6A, 6B:
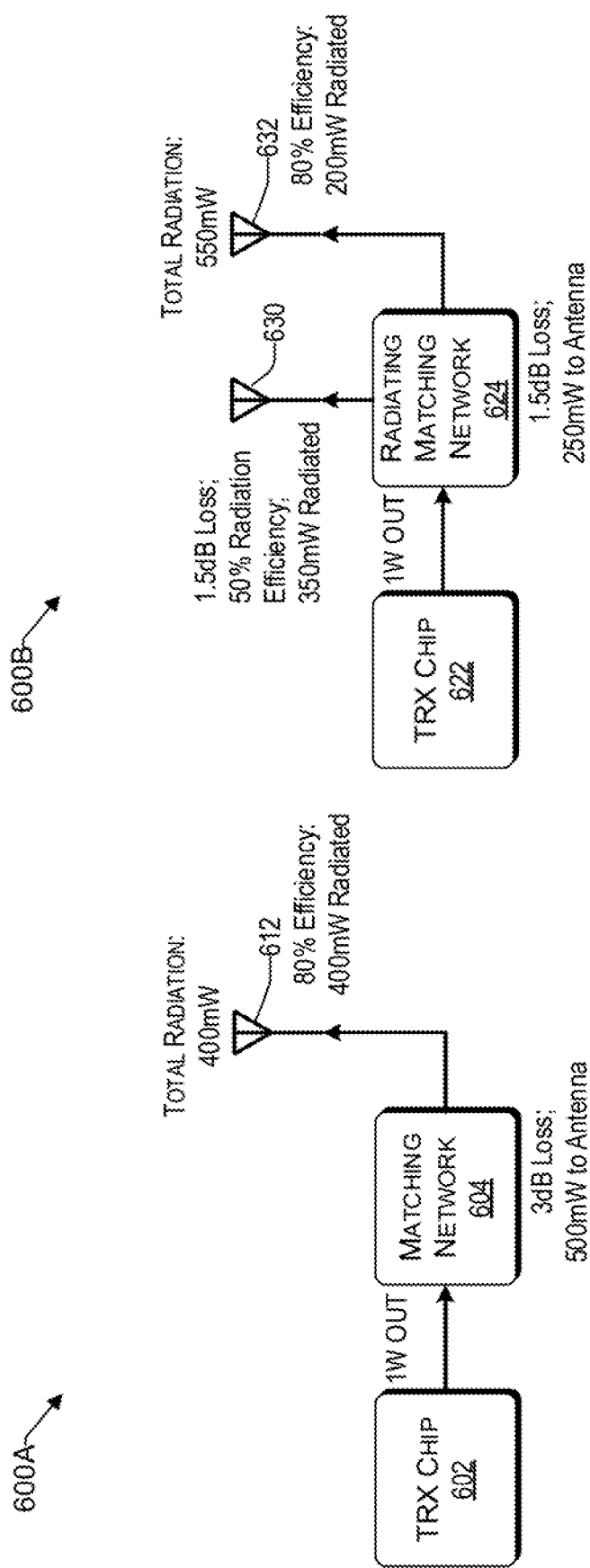
FIG. 6A illustrates a known high efficiency antenna system that includes a transceiver chip, a matching network, and an antenna.
FIG. 6B illustrates an improved efficiency antenna system that includes a radiating matching network, consistent with an illustrative embodiment.

It may now be helpful to provide example calculations to illustrate the improvement in net efficiency by the antenna systems discussed herein. By way of example, FIG. 6A illustrates a known high efficiency antenna system 600A that includes a transceiver chip 602, a matching network 604, and an antenna 612. In the example of FIG. 6A, the transceiver chip 602 provides a 1 W output. The matching network 604 incurs a 3 dB (i.e., 50% power) loss. The remaining power of 500 mW is transmitted to the antenna 612. It is assumed that the antenna is of high efficiency and therefore radiates 80% of its input energy. Accordingly, a 400 mW of effective radiation is achieved by system 600A. Typical sources of efficiency of antennas include conduction losses (e.g., due to finite conductivity of the metal that forms the antenna) and dielectric losses (e.g., due to conductivity of a dielectric material proximate to the antenna).

In contrast, FIG. 6B illustrates a high efficiency antenna system 600B that includes a radiating matching network 624, consistent with an illustrative embodiment. Accordingly, the radiating matching network 624 receives the 1W output from the transceiver chip 622 and applies a first portion of the power after 1.5 dB loss in the first part of the matching network (e.g., 700 mW in the present example) to radiation by way of its radiating element(s) 630. It is assumed that a further 1.5 dB (e.g., 30%) is lost by the remaining components of the radiating matching network 624. The remaining 250 mW is applied to the antenna 632. Assuming an efficiency of 50% and 80% for the radiating element(s) 630 and the antenna 632, respectively, then 350 mW+200 mW=550 mW is radiated by system 600B.

In one embodiment, since the radiating matching network 624 is electrically closer (i.e., in the series connection) to the transceiver chip 622 than the antenna 632, a larger fraction of the signal power of the transceiver chip 622 is applied to the radiating elements 630 of the radiating matching network 624 than the antenna 632. Thus, the power radiated by the radiating matching network 624 via its radiating element(s) 630 may be larger than that of the antenna 632.

Figure 7:
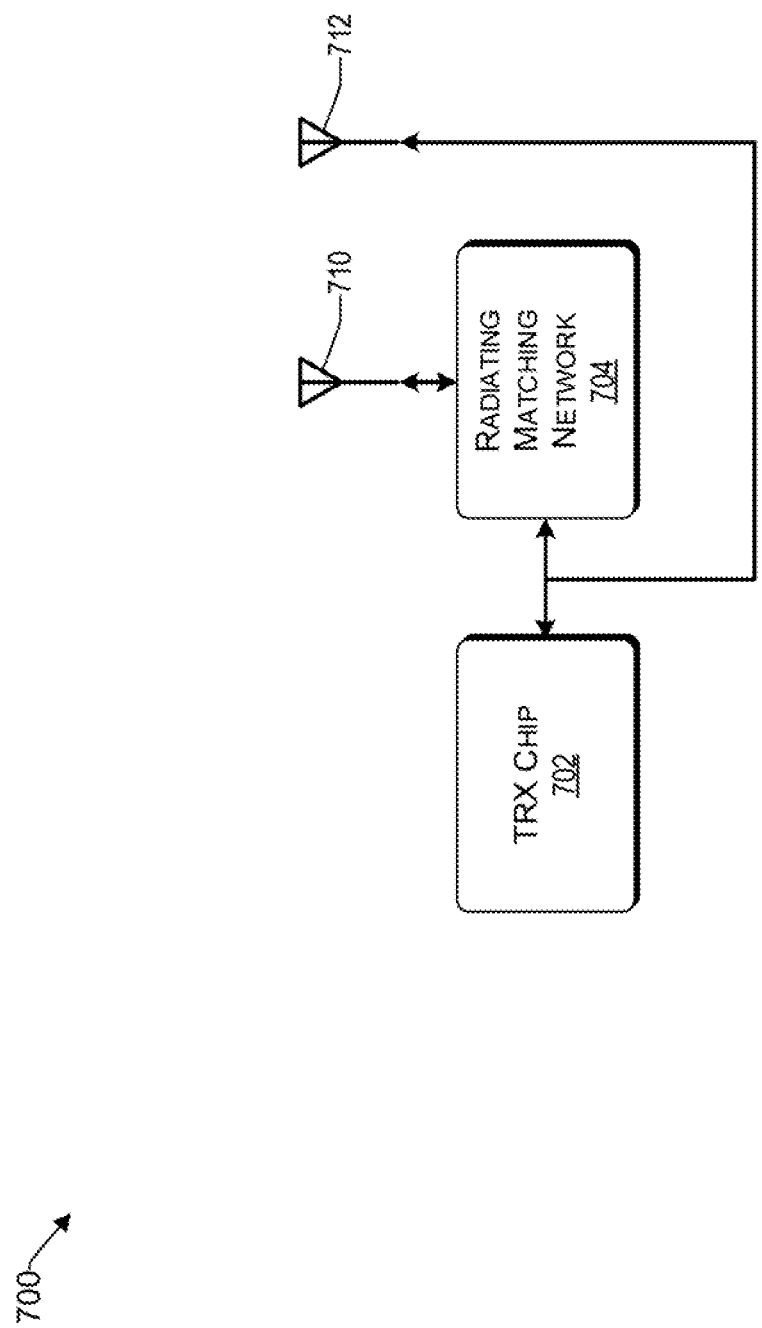
FIG. 7 illustrates an antenna system where the radiating matching network is in parallel to the main antenna.

While system 600B has a series connection between the radiating matching network 624 and the antenna 632, in some embodiments, the radiating matching network may be parallel to the antenna. In this regard, FIG. 7 illustrates an antenna system 700 where the radiating matching network 704 is in parallel to the antenna 712. Stated differently, both the radiating network 704 and the antenna 712 are connected in parallel to the output of the transceiver chip 702.

Regardless of whether the radiating matching network is coupled in parallel or in series with respect to the main antenna, in contrast to traditional systems that do not have a matching network with components that provide desired radiation, the dissipation of power by the radiating matching network 624 or 704 results in a net gain in system radiation instead of a "loss." Accordingly, by virtue of using the radiating matching network 624 having radiating element(s) 630 and 710, respectively, a substantial improvement in system radiation efficiency is achieved. In this regard, it is noted that if the efficiency of the antenna is even lower, as may be exhibited in small form factor devices, such as portable user devices having transceiver chips that are 1 mm×1 mm or smaller, than the benefit over the traditional approaches is even more pronounced.

Example Layout Floorplans

Figure 8:
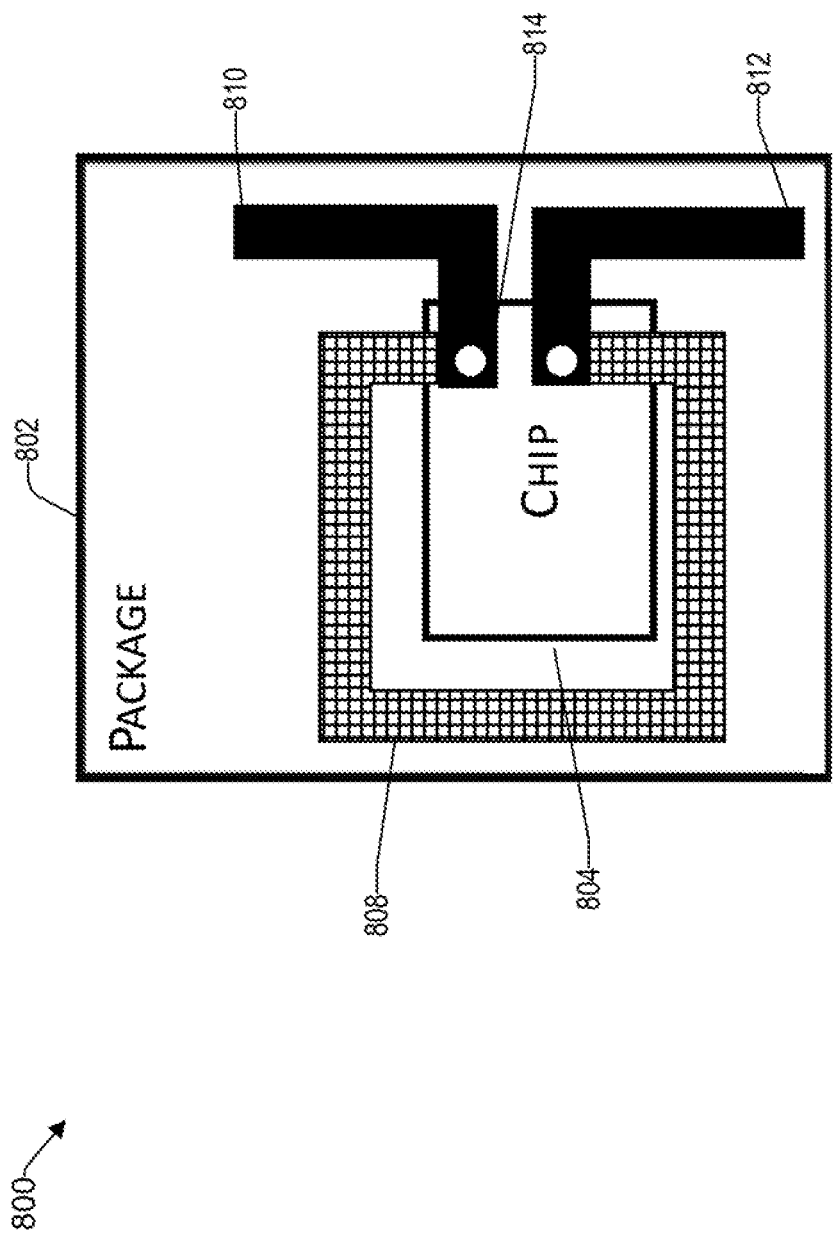
FIG. 8 illustrates an example layout floorplan of an antenna system, consistent with an illustrative embodiment.

With the foregoing overview of the concepts of a radiating matching network that is configured to transmit a desired radiation, it may be helpful to provide example layout floorplans. In this regard, FIG. 8 illustrates an example layout floorplan of an antenna system, consistent with an illustrative embodiment. The layout 800 illustrates a package 802 having a chip 804 that is coupled to a radiating matching network 808 and an antenna 810/812. In various embodiments, the chip may be a receiver, transmitter, or a combination thereof (i.e., transceiver). For simplicity, each chip is referred to herein as a transceiver chip, while it will be understood that it could be a transmitter or a receiver, independently. In the example of FIG. 8, the radiating matching network 808 is represented by way of example and not by limitation, as a loop antenna. The antenna 810 is represented by way of example and not by limitation, as a dipole antenna having a first end 810 and a second end 812. The radiating matching network 808 is coupled to the dipole antenna 810/812 in parallel via connectors 814, while it will be understood that a series connection, where the radiating matching network is between the transceiver chip 804 and the dipole antenna 810/812 is possible as well.

For example, in the context of resonance matching, the radiating matching network 808 (e.g., represented by a loop antenna) is configured to match the reactive part of the (e.g., dipole) antenna 810/812, such that they cancel out. In this scenario, the real portion of the impedance of the dipole antenna 810/812 need not be adjusted. Thus, the dipole has a negative reactive part and therefore looks capacitive. The loop antenna 808 provides the positive reactance part, which means that it behaves inductive. The two elements (i.e., the dipole and the loop) are configured in such a way such that these two reactances cancel each other out (e.g., at desired frequencies). Stated differently, the loop antenna 808 provides a conjugate match with the reactive part of the dipole antenna 810/812. In this way, the power provided by the transceiver chip 804 can go into the real part of the dipole antenna 810/812, which is mostly radiative resistance, meaning that most of the power is radiated at a predetermined frequency.

It is also noted that all the elements of the matching network need not be radiative. Thus, the radiating matching network 808 can be configured such that first set of one or more components are used to achieve a desired radiation. However, while achieving a desired radiation, the first set of components may not be enough to achieve a desired matching for the antenna 810/812. To that end, a second set of one or more components is used to provide additional tuning to achieve the desired matching for the antenna 810/812. The second set of components are not configured to be radiating. For example, the second set of components may include at least one of: an inductor, capacitor, resistor, or any combination thereof, to achieve the desired matching for the antenna 810/812.

For example, the layout floorplan 800 may be preferred for transceiver chip 804 sizes of 1 mm×1 mm or smaller. For larger transceiver chip 804 sizes and corresponding antennas 810/812, the radiating matching network may comprise a dipole antenna, whereas the main antenna (that is being matched) is a loop antenna. Thus, in various embodiments, the radiating matching network may be configured to include a loop antenna or a dipole antenna. Similarly, the main antenna may be a loop antenna or a dipole antenna.

In this regard, FIGS. 9A to 9C illustrate different configurations between the radiating elements of the radiating matching network and the antenna, consistent with example embodiments. FIG. 9A illustrates a layout floorplan 900A that includes a transceiver chip 904, a radiating matching network comprising a loop antenna 908 and a main antenna 910 that is being matched (configured as a loop antenna). In the example layout floorplan 900B of FIG. 9B, the matching network 928 and the main antenna 920 are both dipole antennas coupled in parallel to the transceiver chip 924. In the example layout floorplan 900C of FIG. 9C, the matching network 938 comprises a dipole antenna and the main antenna 930 is a loop antenna, wherein both the matching network and the main antenna 930 are coupled in parallel to the transceiver chip 934. Thus, the foregoing FIGS. 8, 9A, 9B, and 9C demonstrate that different permutations of antennas can be used for both the radiating matching network and the main antenna.

The packages discussed herein, including 802, 902, 922, and 934 may be used in various devices and applications, including portable handsets, smart-phones, tablet computers, personal digital assistants (PDAs), virtual reality (VR) devices, augmented reality (AR) devices, smart watches, radio frequency identification (RFID) devices, and other consumer and/or business electronic devices.

Example Process

Figure 10:
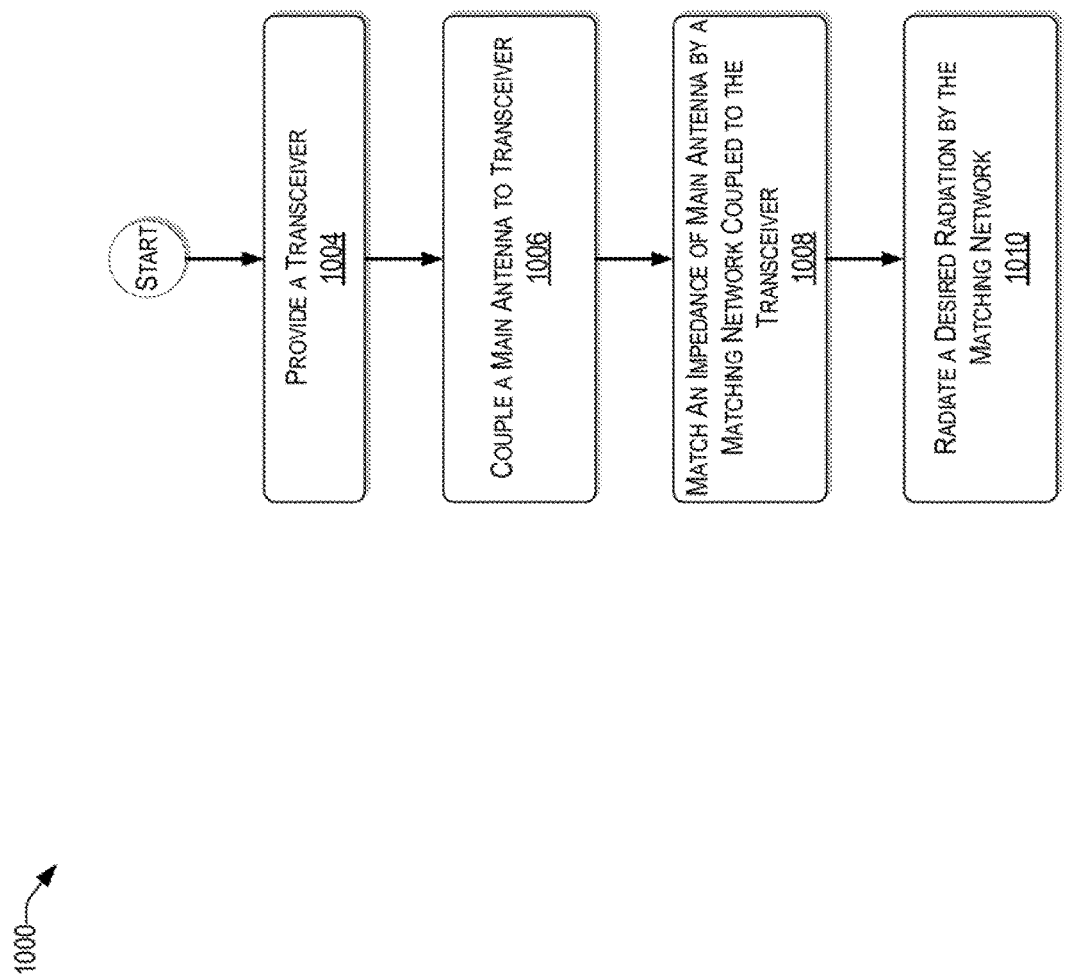
FIG. 10 presents a process for controlling a capacitance of a variable capacitance circuit, consistent with an illustrative embodiment.

With the foregoing discussion of radiating matching networks that are configured to transmit a desired radiation, it may be helpful now to consider a high-level discussion of an example process. To that end, FIG. 10 presents a process 1000 for providing an efficient total radiation. Process 1100 is illustrated as a collection of processes in a logical flowchart, wherein each block represents a sequence of operations that can be implemented by appropriately configured circuits that can include both active and passive components, such as transistors, resistors, capacitors, and inductors.

At block 1004, a transceiver is provided. While a transceiver is described by way of example for simplicity, it will be understood that an independent transmitter or an independent receiver can be used instead. At block 1006, the main antenna is coupled to the transceiver. At block 1008, a matching network coupled to the transceiver and the main antenna, matches an impedance of the main antenna. At block 1010, a desired radiation is provided by the matching network. In one embodiment, a first set of one or more components of the matching network is used to achieve a desired radiation of the matching network while providing a part of the matching of the main antenna. A second set of one or more components is used to provide the remainder of the matching, wherein the second set of components do not radiate.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart and block diagrams in the Figures illustrate the architecture, functionality, and operation of possible implementations of systems and methods according to various embodiments of the present disclosure. In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:
   a transmitter;
   a main antenna coupled to the transmitter; and
   a matching network coupled to the transmitter and configured to match an impedance of the main antenna, wherein one or more components of the matching network provide a desired radiation by the matching network itself acting as an antenna.

2. The device of claim 1, further comprising a receiver, wherein the transmitter and the receiver together provide a transceiver.

3. The device of claim 1, wherein the matching network is positioned physically closer to the transmitter than the main antenna.

4. The device of claim 1, wherein a larger fraction of a power of the transmitter is applied to the matching network than the main antenna.

5. The device of claim 4, wherein the matching network is configured to radiate more than the main antenna.

6. The device of claim 1, wherein the matching network comprises a loop antenna.

7. The device of claim 6, wherein the main antenna is a dipole antenna.

8. The device of claim 1, wherein the matching network comprises a dipole antenna.

9. The device of claim 8, wherein the main antenna is a loop antenna.

10. The device of claim 1, wherein the transmitter, the matching network, and the dipole antenna are coupled in series.

11. The device of claim 1, wherein the matching network and the dipole antenna are coupled in parallel at an output of the transmitter.

12. The device of claim 1, wherein the desired radiation of the matching network is different from a radiation of the main antenna by at least one of: (i) a direction, (ii) a frequency, or (iii) a polarization of the radiation.

13. A device, comprising:
    a receiver;
    a main antenna coupled to the receiver; and
    a matching network coupled to the receiver and configured to match an impedance of the main antenna, wherein one or more components of the matching network provide a desired radiation by the matching network itself acting as an antenna.

14. The device of claim 13, wherein the matching network is positioned physically closer to the receiver than the main antenna.

15. The device of claim 13, wherein a larger fraction of a power of the receiver is applied to the matching network than the main antenna.

16. A method of transmitting signals, comprising:
    providing a transceiver;
    coupling a main antenna to the transceiver;
    matching an impedance of the main antenna by a matching network coupled to the transceiver; and
    radiating a desired radiation by the matching network itself acting as an antenna.

17. The method of claim 16, further comprising applying a larger fraction of a power of the transceiver to the matching network than to the main antenna.

18. The method of claim 16, further comprising coupling the transmitter, the matching network, and the dipole antenna in series.

19. The method of claim 16, further comprising coupling the matching network and the dipole antenna in parallel at an output of the transceiver.

20. The method of claim 16, wherein the desired radiation of the matching network is different from a radiation of the main antenna by at least one of: (i) a direction, (ii) a frequency, or (iii) a polarization of the radiation.

* * * * *